(12) United States Patent
Li et al.

(10) Patent No.: US 10,477,154 B2
(45) Date of Patent: Nov. 12, 2019

(54) SYSTEM AND METHOD FOR ALIGNING TWO WORK PIECES WITH A VISION SYSTEM IN THE PRESENCE OF OCCLUSION

(71) Applicant: Cognex Corporation, Natick, MA (US)

(72) Inventors: David Y. Li, West Roxbury, MA (US); Lei Wang, Wayland, MA (US)

(73) Assignee: Cognex Corporation, Natick, MA (US)

( * ) Notice: Subject to any disclaimer, the term of this patent is extended or adjusted under 35 U.S.C. 154(b) by 314 days.

(21) Appl. No.: 13/788,973

(22) Filed: Mar. 7, 2013

(65) Prior Publication Data

US 2014/0253720 A1    Sep. 11, 2014

(51) Int. Cl.
*H04N 7/00* (2011.01)
*H04N 7/18* (2006.01)
*B25J 9/16* (2006.01)
*G05B 19/402* (2006.01)

(52) U.S. Cl.
CPC ............ *H04N 7/18* (2013.01); *B25J 9/1697* (2013.01); *G05B 19/402* (2013.01); *G05B 2219/49113* (2013.01)

(58) Field of Classification Search
CPC ........ H04N 7/18; H01L 21/681; B26D 7/018; B41F 27/005; G01B 11/00
See application file for complete search history.

(56) References Cited

U.S. PATENT DOCUMENTS

| 5,386,121 A | * | 1/1995 | Barbee et al. ............. 250/341.8 |
| 6,088,103 A | | 7/2000 | Everett et al. |
| 6,304,050 B1 | * | 10/2001 | Skaar et al. ............. 318/568.11 |
| 7,274,812 B2 | | 9/2007 | Saeki |

(Continued)

FOREIGN PATENT DOCUMENTS

| CN | 103153553 A | 6/2013 |
| EP | 1622082 B1 | 5/2012 |
| WO | 2012027541 A1 | 3/2012 |

OTHER PUBLICATIONS

Iphone, http://www.imore.com/weekly-mod-diy-replace-iphone-3g3gs-lcd-screen, accessed Oct. 2, 2012.*

(Continued)

*Primary Examiner* — Frank F Huang
(74) *Attorney, Agent, or Firm* — Loginov IP

(57) ABSTRACT

This invention provides a system and method for aligning a first work piece with an underlying second work piece in the presence of occlusion by the first work piece of critical alignment features of the second work piece. The vision system, which guides the motion of a manipulator holding the first work piece and a motion stage holding the second work piece, learns secondary alignment features at least one of the first and second work pieces. Using these secondary features, the vision system determines alignment between the work pieces and guides the manipulator and the motion stage to achieve alignment as the first work piece engages the second work piece. The secondary features are used to define a course alignment. Deterministic movements of the manipulator and/or motion stage are used to learn the relationship between the secondary and primary features. Secondary features are used to direct alignment.

17 Claims, 5 Drawing Sheets

(56) References Cited

U.S. PATENT DOCUMENTS

| | | | |
|---|---|---|---|
| 7,324,682 | B2 | 1/2008 | Wasserman |
| 7,522,763 | B2 | 4/2009 | Tessadro |
| 7,809,181 | B2 | 10/2010 | Yamashita |
| 7,961,934 | B2 | 6/2011 | Thrun et al. |
| 2006/0088202 | A1* | 4/2006 | Venkatachalam ............ 382/152 |
| 2006/0130974 | A1* | 6/2006 | Koopmans ................ 156/379.8 |
| 2012/0249590 | A1 | 10/2012 | Maciocci et al. |
| 2013/0147944 | A1* | 6/2013 | Zhang et al. ................... 348/95 |
| 2014/0104441 | A1* | 4/2014 | Rime et al. ................ 348/207.1 |

OTHER PUBLICATIONS

Removal of BGA Chip on Xbox 360 Board Using Pace IR3000 Rework Station; https://www.youtube.com/watch?v=sYqBzxt1wxo; Mar. 15, 2012.*

Installation, https://www.youtube.com/watch?v=G1i6BAD_nZc; Mar. 15, 2012.*

Roh, et al., "Face Alignent Robust to Occlusion", "IEEE International Conference on Automatic Face and Gesture Recognition", 2011, Publisher: IEEE, Published in: US.

\* cited by examiner

SYSTEM AND METHOD FOR ALIGNING TWO WORK PIECES WITH A VISION SYSTEM IN THE PRESENCE OF OCCLUSION

FIELD OF THE INVENTION

This invention relates to vision systems used in the alignment of objects with respect to each other, and more particularly to the alignment of objects that are assembled in an overlying relationship.

BACKGROUND OF THE INVENTION

In machine vision systems (also termed herein "vision systems"), one or more cameras are used to perform vision system process on an object or surface within an imaged scene. These processes can include inspection, decoding of symbology, alignment and a variety of other automated tasks. More particularly, a vision system can be used to inspect a flat work piece passing through an imaged scene. The scene is typically imaged by one or more vision system cameras that can include internal or external vision system processors that operate associated vision system processes to generate results.

In various manufacturing processes, it is desired to align one flat work piece with respect to another work piece. More particularly, in assembly applications, one independent work piece is aligned to another independent work piece in a process that entails moving an overlying first work piece into a position in which it hovers over a second work piece and then is lowered into place. One exemplary process entails inserting the cover glass of a cellular telephone or a tablet computer into its housing. Another exemplary process can entail lowering a window glass into a window frame or placing a circuit chip onto a circuit board. In such manufacturing processes, work pieces must be aligned along the x and y translation directions of a reference plane, along with rotation (Θ) within the x-y plane, and they are lowered along the orthogonal z-axis into final engagement. This is accomplished using a robot manipulator and/or motion stages that grasp(s) the first work piece and uses feedback from the vision system to align it with the second work piece. While the use of a three-dimensional (3D) vision system can be employed in such processes, it is contemplated that 2D vision systems can perform adequately where the x-y planes of the two work pieces remain parallel at all elevations/heights (along the z axis).

In many applications, after seating the first work piece within the second work piece, the alignment accuracy between them is measured by the gap between the outer edge of the first work piece and the inner edge of the second work piece. Ideally, these edges should be the primary alignment features for aligning two such objects as they are assembled together by a robot manipulator and/or motion stage(s). However, as noted above, before the first work piece is fully seated into the second work piece, the manipulator/motion stage causes the first work piece to hover above the second, and the first work piece may occlude the second work piece's inner edges from the camera's view or from the illumination source. Thus, it is often challenging to simultaneously view the critical alignment features in each work piece, which must be accurately aligned relative to each other, as the manipulator and/or motion stage is moved to complete the assembly process.

It is therefore desirable to provide a technique for reducing or eliminating uncertainties in the alignment process where a first work piece partially occludes critical alignment features of a second, underlying work piece.

SUMMARY OF THE INVENTION

This invention overcomes the disadvantages of the prior art by providing a system and method for aligning a first work piece with an underlying second work piece in the presence of occlusion by the first work piece of critical alignment features of the second work piece. The vision system, which guides (e.g. along a z direction) the motion of the manipulator holding the first work piece and the movement (e.g. along an x and y direction) of a motion stage that holds the second work piece, learns secondary alignment features on at least one of the first work piece and the second work piece. Using these secondary alignment features, the vision system determines proper alignment between the work pieces and guides the manipulator and/or the motion stage to achieve proper alignment as the first work piece is lowered into engagement with the second work piece. In particular, the process directs a series of deterministic movements of the manipulator and/or motion stage to expose the primary alignment features and then learn the relationship between the poses of secondary features and the primary features. The secondary features are then used, at least in part, to direct final alignment during assembly.

In an illustrative embodiment, a system and method for aligning a first work piece that is assembled to an underlying second work piece includes a vision system camera assembly that images a scene containing the first work piece and the second work piece in each of an unassembled and assembled configuration therebetween. An alignment process receives image data with respect to the scene from the vision system camera assembly. This alignment process is constructed and arranged to: (a) determine secondary alignment features in at least one of the first work piece and the second work piece; (b) move at least one of a manipulator and a motion stage to expose occluded primary alignment features in at the least one of the first work piece and the second work piece and acquire an image thereof; and (c) acquire images of the scene, and based thereon, establish a relationship between the primary alignment features and secondary alignment features to thereby allow alignment using a motion control process. The motion control (process) employs the relationship to guide assembly of the first work piece with respect to the second work piece. This is accomplished based upon the secondary alignment features. Illustratively, the primary alignment features of the first work piece define an outer edge and the secondary alignment features of the first work piece define a top edge remote from the outer edge. At least a portion of the first work piece can be transparent in an area adjacent to the inner edge and the outer edge and the inner edge can define a corner of a bevel along a top surface of the first work piece. Likewise, the primary alignment features of the second work piece define an inner edge and the secondary alignment features of the first work piece define an outer edge remote from the inner edge. This inner edge can define an edge of in inwardly directed shelf that supports the first work piece in the assembled configuration and the outer edge can define at least part of an outer boundary of the second work piece. The motion control process can move the motion stage in each of an x direction and a y direction, and move the manipulator in at least a z direction, perpendicular to a plane containing the x direction and the y direction. More generally, at least one of the manipulator and the motion stage can be moved in at least one of the x, y and z directions, and rotation about the z. Illustratively, the vision system camera assembly includes a plurality of cameras oriented to image predetermined locations with respect to the first work piece and the second work piece, and wherein the each of the cameras is operatively connected with the alignment process.

BRIEF DESCRIPTION OF THE DRAWINGS

The invention description below refers to the accompanying drawings, of which.

DETAILED DESCRIPTION

Figure 1:
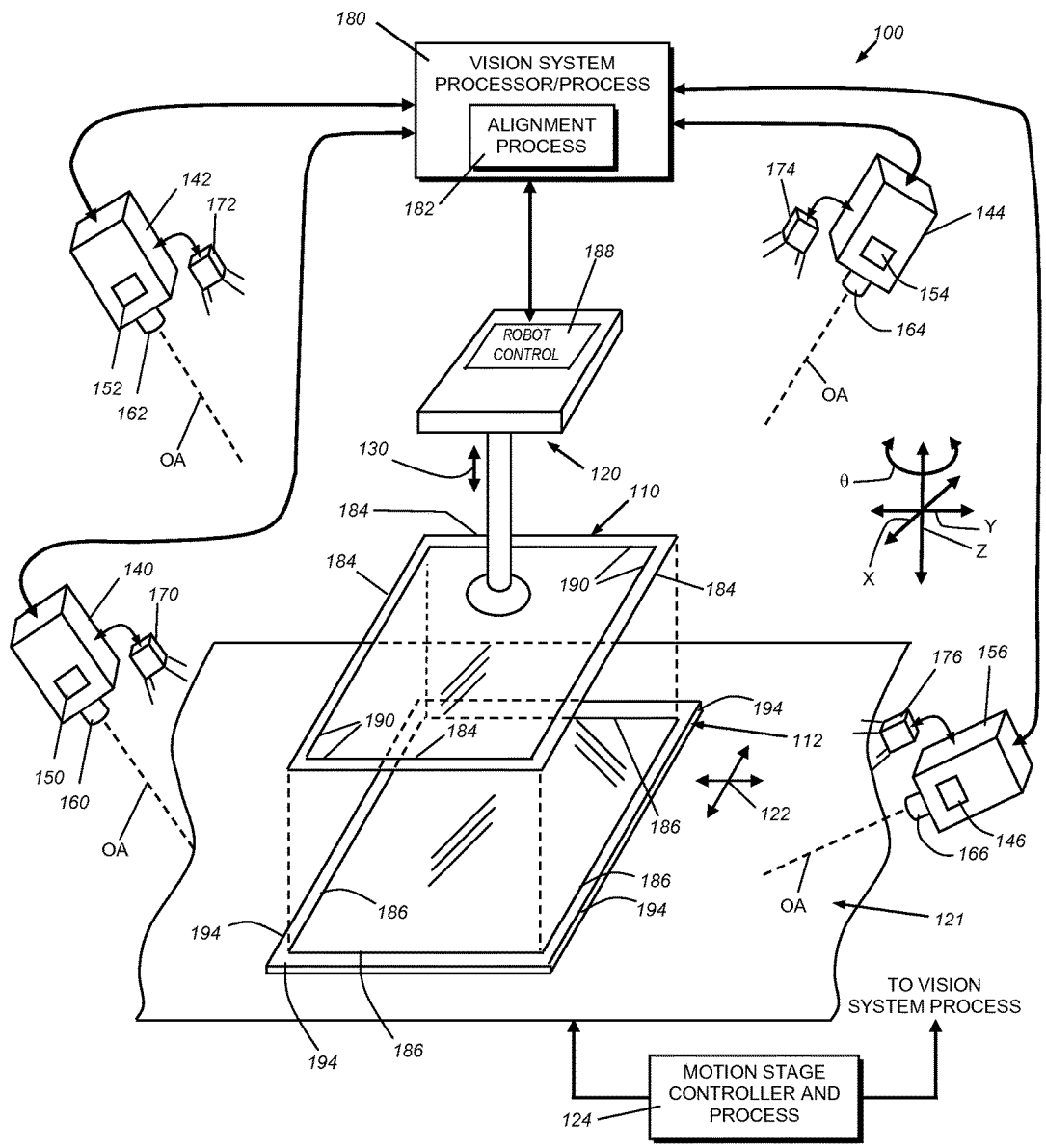
FIG. 1 is a diagram of a work piece assembly arrangement in which alignment of the first work piece to an underlying second work piece, in the presence of occlusion, is controlled by an alignment process in a vision system.

FIG. 1 shows a generalized manufacturing arrangement 100 in which a first work piece 110 is suspended above a second work piece 112 by a moving robot manipulator assembly 120. The first work piece 110 can be a transparent window or other planar structure in various embodiments and the second work piece 112 can be a frame or housing that is constructed and arranged to permanently receive the first work piece 110 in an assembly step. The first work piece can be transparent (as shown), semi-transparent or opaque over all or a portion of its surface. The unassembled and assembled configurations for the work pieces 110, 112 are described further below. The second work piece 112 is located on a motion stage (that can include a part conveyor) 121 that moves in each of two directions (double arrows 122) in a forward and reverse manner under the control of a motion stage controller and associated control process 124 in accordance with skill in the art. The directions 122 can be characterized as x-axis and y-axis translation (or motion) within an x-y plane. The manipulator assembly 120 is constructed and arranged to move (arrow 130) along at least one axis (z) and optionally along the x and/or y axis. The direction of manipulator motion, and the directions of movement of the motion stage 121 can be considered the axes in a global "motion coordinate system" of the vision system cameras to which they are all calibrated during an offline (non-runtime) calibration process using appropriate techniques. Rotation of the first work piece 110 and/or the second work piece 112 about the z axis (shown as double curved arrow Θ) can also be provided by the manipulator 120 and/or the motion stage 121, respectively, in certain implementations. In general, the exemplary arrangement 100 omits rotation (i.e. is free of "tilt") about the x or y axes so that the first work piece 110 remains fixed within an x-y plane parallel to a plane defined by the motion stage 121 and/or second work piece 112. In alternate embodiments, tilt is permitted, but entails additional vision system processes to account for such additional degrees of freedom.

The arrangement 100 includes at least one, and illustratively four, vision system cameras 140, 142, 144 and 146, each with a respective image sensor (or simply "sensor") 150, 152, 154 and 156. Each sensor 150, 152, 154 and 156 receives light from an imaged scene within its field of view through a respective lens assembly 160, 162, 164 and 166. The scene is illuminated by one or more illumination assemblies 170, 172, 174 and 176 that can be strobed by the processors of respective cameras 140, 142, 144 and 146. One or more of the illumination assemblies can be "internal", such as a ring illuminator surrounding the camera lens on the camera housing, or one or more of the illumination assemblies can be external, positioned to provide an acceptable illumination effect at the scene so as to minimize occlusion and other undesirable effects, such as reflections due to specularity of surfaces. A greater or fewer number of illuminators can be provided than those depicted in the arrangement 100 of FIG. 1. Additionally, while the cameras 140, 142, 144 and 146 are depicted with optical axes OA tilted toward the scene (at an acute angle with respect to the z axis), in alternate embodiments, the cameras optical axes OA of each of the cameras can be approximately on-axis with the z axis. In general the cameras are arranged to provide as complete, unobstructed a view of the edges of two work pieces 110 and 112.

A vision system processor for each camera can be located, in whole or in part, within the respective camera housing. The vision system processor and processing functionality associated with each camera is represented by block 180. Where an individual vision system processor 180 is provided to each camera, that camera can individually process image information, and share vision system results with a further remote processor, such as a PC. Alternatively, one or more camera processor(s) can act as a "master" vision system processor, and the other cameras act as a "slave", delivering unprocessed image data to the master for further processing. Alternatively, all cameras 140, 142, 144 and 146 can be arranged to deliver image frames to a central vision system processing unit (e.g. a PC) via appropriate camera interfaces (for example, a USB link or TCP/IP-based network).

Note, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

The vision system processor/process 180 includes an alignment process 182 according to an illustrative embodiment. The alignment process 182 is constructed and arranged to ensure proper alignment of the outer edges 184 of the first work piece 110 with the inner edges 186 of the second, underlying work piece 112. This alignment process is in communication with the robot control 188 of the manipulator assembly 120 to follow and instruct z-axis motion and also with the motion stage controller 124 to follow and instruct x and y-axis motion. Based upon feedback from the alignment process 182, the motion stage 121 is controlled (typically in the x and y directions) to move the first work piece 110 into appropriate alignment with the second work piece 112 as the manipulator lowers the first work piece along the z axis into engagement with the second work piece. As described above, a key challenge in this operation is that, during manipulation, part of the inner edge 186 of the second work piece can be occluded by the overlying first work piece, or the illumination can be shadowed or otherwise disrupted, thereby providing a broken image to the camera system. Thus, the alignment process could lack information needed to properly determine alignment.

Figure 2:
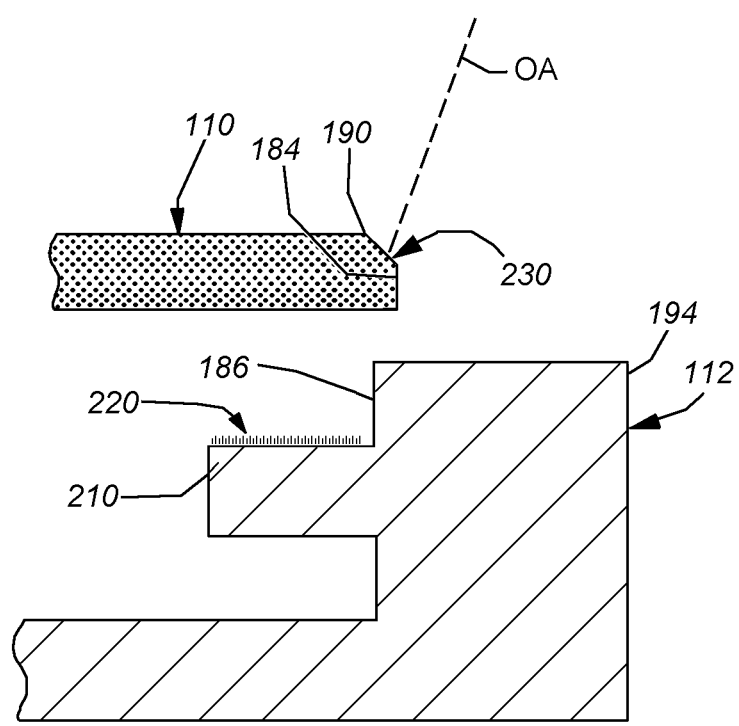
FIG. 2 is a fragmentary side cross section of a first work piece hovering over an underlying second work piece illustrating respective edges defining primary alignment features and secondary alignment features for use by the vision system of FIG. 1, and showing occlusion of an edge.

With further reference to FIG. 2, an exemplary edge relationship for each work piece is shown in fragmentary cross section. The second work piece 112 include an exemplary "shelf" inward of the inner edge 186 on which the first work piece is to be supported. In this example, an adhesive layer 220 is provided on the shelf 210 to permanently (or semi-permanently) secure the work pieces together. An alternate securing mechanism, such as clips or an overlying bezel, can be employed in other assemblies. As shown in FIG. 2, the manipulator and motion stage have positioned the first work piece 110 into an orientation in which its outer edge 184 overlies the inner edge of the second work piece 112. This positioning effectively occludes the view of the associated camera as indicated by its optical axis OA, and renders alignment by the alignment process 182 more challenging as information on the location of the edge 186 is lacking.

In addition to the occlusion of the edge 186 as shown in FIG. 2, due to variations in light and the optical effects of the underlying second work piece, sometimes the outer edge 184 of the first work piece is not completely visible to the associated camera. This affords greater challenges to proper alignment of work pieces by the alignment process 182.

In a typical alignment process, the critical alignment features are the two edges 184 and 186 that are used to define a gap (G in FIGS. 3 and 4 described further below) that occurs when the two work pieces are properly aligned. It is recognized that most work pieces contain "secondary" alignment features that can be used to assist in aligning the work pieces. By way of example, the first work piece 110 includes an inner/top edge 190 that is defined by a bevel 230. This inner/top edge 190 is more likely to be fully visible to each camera as it is clearly exposed at the top of the work piece 110 inboard from the outer edge 184 (which can be partially or fully occluded as described above). Likewise, the second work piece 112 includes an outer edge 194 that can define a secondary alignment feature. Note that other defined features on either work piece, such as ridges, holes, printing, and the like, that remain visible during the process and have a know relation to the critical/primary alignment features can be used as secondary alignment features in alternate embodiments.

Figure 3:
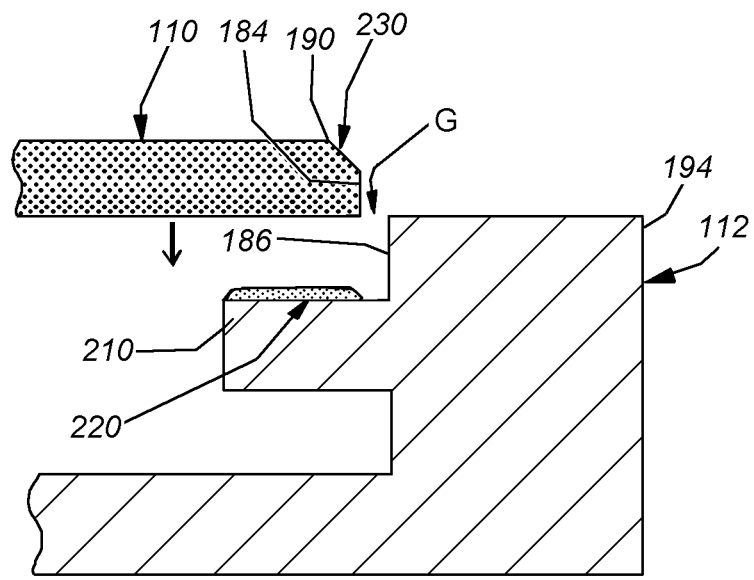
FIG. 3 is a fragmentary side cross section of the first work piece hovering over the second work piece, in which the manipulator has moved the first work piece into appropriate alignment with the second work piece.
Figure 4:
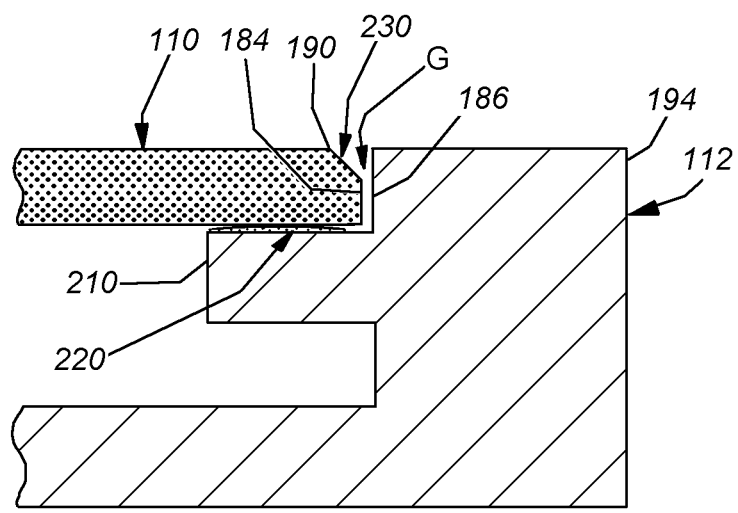
FIG. 4 is a fragmentary side cross section of the first work piece in aligned engagement with the underlying second work piece.
Figure 5:
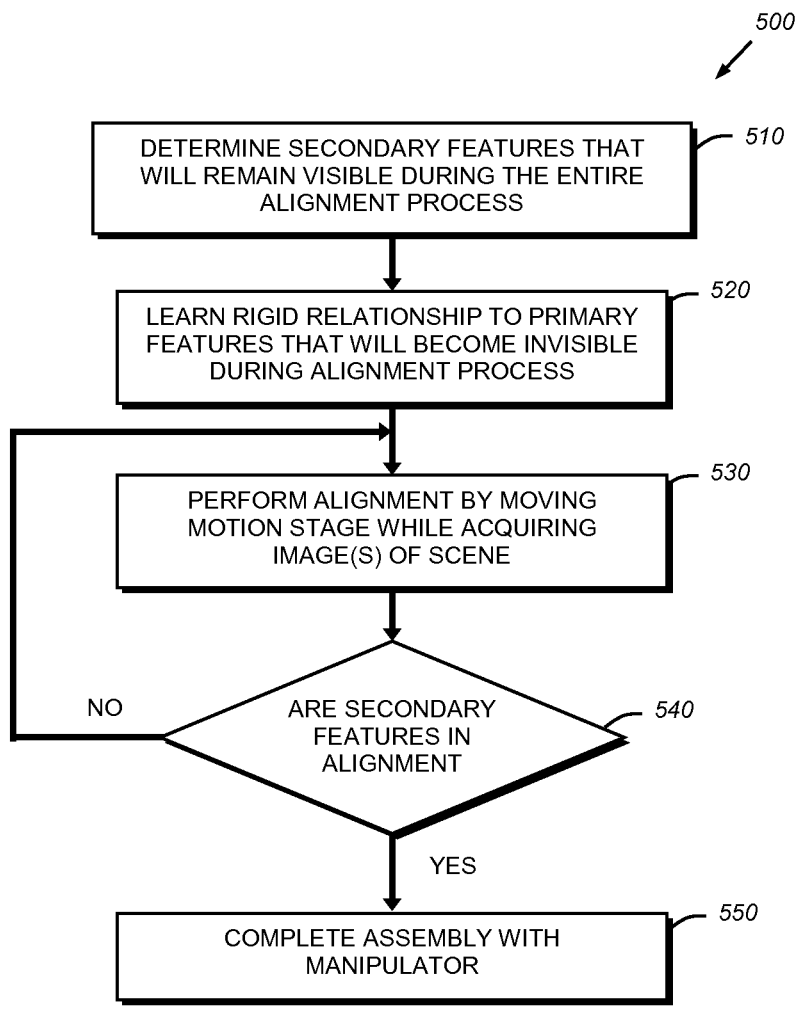
FIG. 5 is a flow diagram of an alignment procedure using secondary alignment features to deduce locations of critical/primary alignment features.

With reference to FIGS. 3 and 4, and the flow diagram of FIG. 5, a procedure 500 for aligning the first work piece with respect to the second work piece using secondary alignment features in addition to critical/primary alignment features is now described in further detail. In initial step 510, as each work piece is provided to the manufacturing arrangement, the procedure 500 identifies secondary alignment features (e.g. edges 190 and 194) that will remain visible during the entire alignment process. The locations of these features are stored and related to the motion coordinate system by the alignment process. Then in step 520, the procedure 500 learns the rigid relationship between these secondary alignment features and the critical/primary alignment features that will become invisible (occluded) during movement of the manipulator to align the work pieces. It is contemplated that the relationship of primary to secondary features can vary from work piece to work piece.

Figure 6:
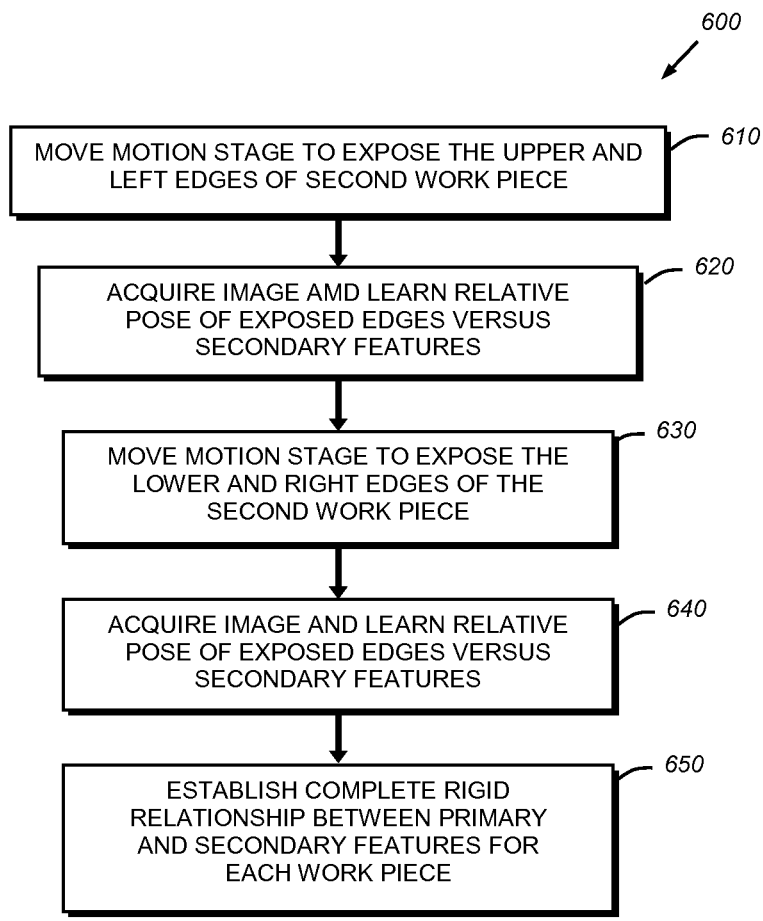
FIG. 6 is a flow diagram of a sub-procedure of FIG. 5 for performing a sequence of deterministic motion steps that expose invisible and/or occluded edges of the second work piece and allow a rigid relationship between poses of primary and secondary alignment features to be established.

In learning the rigid relationship between poses of critical/primary and secondary alignment features for each work piece, reference is made to the flow diagram of FIG. 6 in which a sub-procedure is 600 of step 520 is described. In step 610 the alignment process (182) instructs the motion stage (121, via controller 122) to move the second work piece (112) slightly out of occlusion by the first work piece. Initially, according to an embodiment, the upper (further away in the drawing of FIG. 1) edge and left edge of the work piece (112) are concurrently exposed. Once exposed, in step 620 an image is acquired by one or more of the cameras and stored. This image is used to learn the relationship between the relative pose of the exposed critical/primary feature edges and the identified secondary feature edges. This learning step can be carried out for the exposed edges of the second work piece as well as selected edges (184 and 190) of the first work piece where the outer edge 184 is no longer confused with edges of the second work piece—for example the lower and right edges of the second work piece. Then, in step 630 the motion stage can move in the opposite direction to expose the lower edge and right edge of the second work piece. Another image is acquired and the relative poses of exposed and/or unoccluded edges are learned in step 640. Based upon these learned relationships a complete data set describing the relationship between primary and secondary alignment features is established in step 650. As described below, the sequence of motion steps, and/or their direction(s) of motion, are highly variable in other embodiments.

Having established the relationship between clearly visible secondary alignment features and the primary alignment features, the procedure 500 can deduce the poses of the first work piece's outer edges 184 and the second work piece's inner edges 186. Thus, as also shown in FIG. 3, the motion stage is moved (step 530) in the x and/or y directions (arrow 310) to establish the desired alignment, including gap G between critical edges 184 and 186. Images are acquired and analyzed by the alignment process as motion occurs to verify that the secondary features have moved to the proper alignment positions—thereby ensuring that the critical/primary features are now properly aligned. When proper physical alignment has occurred (decision step 540), the manipulator assembly can lower (arrow 320 in FIG. 3 and step 550 in FIG. 5) the first work piece 110 into engagement with the shelf 210 of the second work piece 112. The completed assembly with desired gap G is shown in FIG. 4, with adhesive (or another securing mechanism) maintaining the work pieces in the desired assembled relationship. The assembly can be moved by a conveyor to the next manufacturing location at this time.

While imaging and analysis of secondary features is employed to perform alignment, it is expressly contemplated that, where available, alignment can also be validated using any visible primary features as an added assurance of accuracy.

It should be clear that the system and method described herein provides a quick and effective technique for aligning a wide range of objects that are assembled from and overlying and underlying position using a motion stage and/or manipulator. This system and method requires a relatively small number of additional alignment steps and can operate on a variety of object shapes and sizes.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, x and/or z-axis motion (and rotation) can be performed by the manipulator instead of, or in addition to, the motion stage. Likewise, z-axis motion can be performed by the motion stage in other exemplary manufacturing arrangements. The alignment process and direct appropriate movements in accordance with the general principles of the embodiments herein. Also, while the illustrative process exposes a combination of upper/left and lower/right edges, a variety of motions that concurrently expose either individual edges or combinations of edges can be undertaken in further embodiments. In addition, while the exemplary first work piece and second work piece are described as both including occluded or invisible primary alignment features, it is contemplated that the system and method can be employed where only one of the first work piece and second work piece include such occluded/invisible primary alignment features, and thus secondary features can be employed for alignment only with respect to the work piece having occluded/invisible features. Also, as used herein various directional and orientation terms such as "vertical", "horizontal", "up", "down", "bottom", "top", "side", "front", "rear", "left", "right", and the like are used only as relative conventions and not as absolute orientations with respect to a fixed coordinate system, such as gravity. Accordingly, this description is meant to be taken only by way of example, and not to otherwise limit the scope of this invention.

What is claimed is:

1. A system for aligning a first work piece that is assembled to an underlying second work piece comprising:
    a vision system camera assembly configured to image a scene containing the first work piece and the second work piece; and
    an alignment process receiving image data with respect to the scene from the vision system camera assembly, the alignment process being constructed and arranged to,
    (a) identify secondary alignment features in the first work piece and the second work piece, the secondary alignment features remaining visible during the alignment process,
    (b) move at least one of a manipulator or a motion stage to move at least one of the first work piece or the second work piece in order to concurrently expose at least one occluded first primary alignment feature in at the least one of the first work piece or the second work piece, the at least one occluded first primary alignment feature comprising a first edge and a second edge,
    (c) acquire at least one first image of the scene, the at least one first image of the scene including the at least one exposed first primary alignment feature,
    (d) move at least one of the manipulator or the motion stage to move at least one of the first work piece and the second work piece to concurrently expose at least one occluded second primary alignment feature, the at least one occluded second primary alignment feature comprising a third edge opposing the first edge and a fourth edge opposing the second edge, and
    (e) acquire at least one second image of the scene, and based upon the at least one first image and the least one second image, establish a relationship between the primary alignment features and the secondary alignment features to enable alignment of the first work piece and the second work piece.

2. The system as set forth in claim 1 further comprising a motion control that employs the relationship to guide assembly of the first work piece with respect to the second work piece based upon the secondary alignment features.

3. The system as set forth in claim 1 wherein the primary alignment features of the first work piece define an outer edge and the secondary alignment features of the first work piece define a top edge remote from the outer edge.

4. The system as set forth in claim 3 wherein the inner edge defines a corner, along a top surface of the first work piece, of a bevel.

5. The system as set forth in claim 3 wherein at least a portion of the first work piece is transparent adjacent to the inner edge and the outer edge thereof.

6. The system as set forth in claim 1 wherein the primary alignment features of the second work piece define an inner edge and the secondary alignment features of the first work piece define an outer edge remote from the inner edge.

7. The system as set forth in claim 6 wherein the inner edge defines an edge of in inwardly directed shelf that supports the first work piece in the assembled configuration.

8. The system as set forth in claim 6 wherein the outer edge defines at least part of an outer boundary of the second work piece.

9. The system as set forth in claim 1 further comprising a motion control that employs the relationship to guide assembly of the first work piece with respect to the second work piece based upon the secondary alignment features wherein the motion control moves at least one of the motion stage and the manipulator in at least one of an x direction, a y direction, a z direction perpendicular to a plane containing the x direction and the y direction, and rotation about the z direction.

10. The system as set forth in claim 1 wherein the vision system camera assembly includes a plurality of cameras oriented to image predetermined locations with respect to the first work piece and the second work piece, and wherein the each of the cameras is operatively connected with the alignment process.

11. A method for aligning a first work piece that is assembled to an underlying second work piece comprising the steps of:
    (a) identifying secondary alignment features in the first work piece and the second work piece, the secondary alignment features remaining visible;
    (b) moving at least one of a manipulator and a motion stage to move at least one of the first work piece and the second work piece in order to concurrently expose at least one occluded first primary alignment feature in at the least one of the first work piece and the second work piece, the at least one occluded first primary alignment feature comprising a first edge and a second edge;
    (c) acquiring at least one first image of a scene with a vision system camera assembly, the at least one first image of the scene including the at least one exposed first primary alignment feature;

(d) moving at least one of the manipulator and the motion stage to move at least one of the first work piece and the second work piece to concurrently expose at least one occluded second primary alignment feature, the at least one occluded second primary alignment feature comprising a third edge opposing the first edge and a fourth edge opposing the second edge; and (e) acquiring at least one second image of the scene with the vision system camera assembly, and based upon the at least one first image and the at least one second image, establishing a relationship between the primary alignment features and secondary alignment features, so that the first work piece can be aligned with respect to the second work piece.

12. The method as set forth in claim 11 further comprising, with the relationship, guiding assembly of the first work piece with respect to the second work piece based upon the secondary alignment features.

13. The method as set forth in claim 11 wherein the primary alignment features of the first work piece define an outer edge and the secondary alignment features of the first work piece define a top edge remote from the outer edge.

14. The method as set forth in claim 13 wherein at least a portion of the first work piece is transparent adjacent to the inner edge and the outer edge thereof.

15. The method as set forth in claim 11 wherein the primary alignment features of the second work piece define an inner edge and the secondary alignment features of the first work piece define an outer edge remote from the inner edge.

16. The method as set forth in claim 11 further comprising, with the relationship, guiding assembly of the first work piece with respect to the second work piece based upon the secondary alignment features and moving at least one of the motion stage and the manipulator in at least one of an x direction, a y direction, a z direction perpendicular to a plane containing the x direction and the y direction, and rotation about the z direction.

17. The method as set forth in claim 11 further comprising providing a vision system camera assembly comprising a plurality of cameras oriented to image predetermined locations with respect to the first work piece and the second work piece.

* * * * *